United States Patent
Yoon (10) Patent No.: US 12,074,871 B2
(45) Date of Patent: Aug. 27, 2024

(54) IDENTITY AUTHENTICATION SYSTEM AND METHOD THEREFOR

(71) Applicant: Seong Min Yoon, Guri-si (KR)

(72) Inventor: Seong Min Yoon, Guri-si (KR)

( * ) Notice: Subject to any disclaimer, the term of this patent is extended or adjusted under 35 U.S.C. 154(b) by 0 days.

(21) Appl. No.: 17/767,458

(22) PCT Filed: Oct. 8, 2020

(86) PCT No.: PCT/KR2020/013754
§ 371 (c)(1),
(2) Date: Apr. 8, 2022

(87) PCT Pub. No.: WO2021/071295
PCT Pub. Date: Apr. 15, 2021

(65) Prior Publication Data
US 2024/0089258 A1    Mar. 14, 2024

(30) Foreign Application Priority Data

Oct. 10, 2019    (KR) .......................... 10-2019-0125281

(51) Int. Cl.
*H04L 9/40*      (2022.01)
*G06F 21/31*     (2013.01)
(Continued)

(52) U.S. Cl.
CPC ................................ *H04L 63/0884* (2013.01)

(58) Field of Classification Search
CPC .................................................. H04L 63/0884
(Continued)

(56) References Cited

U.S. PATENT DOCUMENTS

2005/0246278 A1* 11/2005 Gerber ................... G06Q 20/40
705/44
2014/0157381 A1* 6/2014 Disraeli .............. H04L 63/0853
726/7
(Continued)

FOREIGN PATENT DOCUMENTS

JP          2007-196852 A       8/2007
JP          2007196852 A   *    8/2007
(Continued)

OTHER PUBLICATIONS

Tom Barton; Identity Federation and Attribute-based Authorization through the Globus Toolkit, Shibboleth, GridShib, and MyProxy; University of Chicago; pp. 1-14.*

*Primary Examiner* — Monjur Rahim
(74) *Attorney, Agent, or Firm* — LRK PATENT LAW FIRM (57) ABSTRACT

An identity authentication system and a method therefor are provided. The identity authentication system includes an operating computer for user authentication; a user authentication approval request means, which is outputted to an authentication requester terminal of an authentication requester to receive user authentication approval request information and transmit same to the operating computer; and an identity confirmation data provision means, which is outputted to at least one affiliated party terminal of affiliated parties of the authentication requester so-as to provide relationship information and communication details about the authentication requester to the operating computer. The operating computer requests the affiliated parties to confirm whether the authentication requester is the same person with whom the affiliated parties are acquainted, and determines matching between analysis data of the communication details of the affiliated parties with the authentication (Continued)

requester, and data autonomously included in the operating computer, so as to check, on the basis of the the identity of the authentication requester.

10 Claims, 7 Drawing Sheets

(51) Int. Cl.
  *G06F 21/45* (2013.01)
  *G06F 21/60* (2013.01)
(58) Field of Classification Search
  USPC .......................................................... 726/26
  See application file for complete search history.

(56) References Cited

U.S. PATENT DOCUMENTS

| | | | | |
|---|---|---|---|---|
| 2015/0113621 | A1* | 4/2015 | Glickfield | H04L 51/046 |
| | | | | 726/7 |
| 2016/0162900 | A1* | 6/2016 | Dutt | H04L 63/083 |
| | | | | 705/44 |
| 2020/0042723 | A1* | 2/2020 | Krishnamoorthy | G06F 21/45 |
| 2020/0042958 | A1* | 2/2020 | Soundararajan | G06Q 20/401 |
| 2022/0131854 | A1* | 4/2022 | Joshi | G06Q 20/40 |
| 2022/0182388 | A1* | 6/2022 | Boodaei | H04L 63/0861 |
| 2023/0073938 | A1* | 3/2023 | Robinson-Morgan | ........ |
| | | | | H04L 9/321 |

FOREIGN PATENT DOCUMENTS

| | | | | |
|---|---|---|---|---|
| JP | 2019-040557 A | | 3/2019 | |
| JP | 2019040557 A | * | 3/2019 | ........... H05H 7/02 |
| KR | 10-2003-0094930 A | | 12/2003 | |
| KR | 10-1472845 B1 | | 12/2014 | |
| KR | 10-2016-0077102 A | | 7/2016 | |
| KR | 20160077102 A | * | 7/2016 | |
| KR | 10-1874164 B1 | | 7/2018 | |
| KR | 10-1949470 B1 | | 2/2019 | |

* cited by examiner

IDENTITY AUTHENTICATION SYSTEM AND METHOD THEREFOR

CROSS-REFERENCE TO RELATED APPLICATIONS

The present application is a U.S. National Phase entry from International Application No. PCT/KR2020/013754, filed Oct. 8, 2020, which claims priority to Korean Patent Application No. 10-2019-0125281, filed Oct. 10, 2019, the disclosure of which is incorporated by reference herein in their entirety.

BACKGROUND OF THE INVENTION

1. Field of the Invention

The present invention relates to an identity authentication system and method for user authentication, etc. More particularly, the present invention relates to a system and method capable of eliminating inconveniences such as the use of accredited certificate or OTP, and presentation of an identification card every time a user authenticates when necessary and preventing it from being performed in an illegal way.

2. Description of Related Art

In the user authentication performed to receive various services, various security means are used to prevent fraudulent authentication for theft and the like. However, since there is always a possibility that such security means may be illegally authenticated by methods such as forgery, falsification, theft, hacking, etc., various security means have been developed to reduce the possibility.

The invention of a system for a personal authentication using a facial photograph of Republic of Korea Patent No. 10-1472845 (registration date: Dec. 9, 2014) has been registered as a patent.

A system for a personal authentication using a facial photograph of the present invention includes: a personal authentication terminal including a lighting part to generate light, a camera to obtain a facial photograph in real-time, and a controller to operate the lighting unit in a condition identical to lighting information when a facial photograph of a user stored in a database of a personal authentication server is photographed when a signal for a personal authentication is received, obtain a facial photograph in real-time through the camera, and transmit the obtained real-time facial photograph to the personal authentication server; and a personal authentication server including a database to store the facial photograph for authentication and the lighting information when the facial photograph for authentication is photographed, and an authentication unit to compare the real-time facial photograph received from the personal authentication terminal with the facial photograph for authentication stored in the database to determine whether the user match, and transmit a determination result to the personal authentication terminal.

In addition, the invention of a system and method for user authentication using mobile number and personal information of Republic of Korea Patent No. 10-1874164 (registration date: Oct. 15, 2018) is disclosed.

According to one aspect of the patent invention, a user authentication method comprises the following steps of: receiving, by a user authentication system, an agent request including a mobile number of an authentication requesting user from a service providing system, wherein the service providing system transmits the agent request to the user authentication system when a user authentication request having the mobile number of the authentication requesting user is received from a user terminal of the authentication requesting user; obtaining, the user authentication system, first user confirmation information of the authentication requesting user by using the mobile number of the authentication requesting user in response to the agent request; and transmitting, by the user authentication system, the obtained first user confirmation information of the authentication requesting user to the service providing system such that the service providing system performs the user authentication with respect to the user by using the mobile number of the authentication requesting user and the first user confirmation information of the authentication requesting user.

The invention of the 845 patent requires a camera, a lighting device, and a scanning device to obtain a real-time face picture in order to obtain identity authentication. In particular, since it is necessary to provide a lighting control device connected to the lighting device, there are excessively many equipments for authentication. In addition, there is an inconvenient problem in that a photographed face photo must be transmitted to the authentication unit whenever a user authentication request is made.

In addition, the invention of the 164 patent has problems in that it is inconvenient to have to make a call with an authentication authority every time to receive identity authentication and is vulnerable to hacking.

Therefore, an invention of an identity authentication system and method thereof having following characteristics is desired. It is possible to prevent the illegal use of authentication means such as forgery, falsification, hacking, theft or theft, etc., and to simplify the procedure by using the authentication information generated at the time of the first user authentication when requesting user authentication, and to prevent an error of identity authentication for user authentication.

SUMMARY OF THE INVENTION

Technical Problem

The present invention is to solve the problems of the conventional user authentication means. An object of the present invention is to provide an identity authentication system and method having the following characteristics. The operating computer receives the user's identity authentication request, collects information necessary for authentication from related persons such as the user's acquaintances, and sends it to the artificial intelligence computer to request identity authentication, and the artificial intelligence computer analyzes the information collected from related persons and the information it owns, and generates identity authentication information that determines whether the user is the same person based on the analyzed data, and the operating computer receives the identity authentication information from the artificial intelligence computer and performs user authentication based on the identity authentication information.

Another object of the present invention is to provide an identity authentication system and method having the following characteristics. Whenever there is a request for identity authentication, the operating computer performs identity authentication using the identity authentication information generated based on the data already analyzed by the artificial intelligence computer, wherein the already analyzed data is the data analyzed by the artificial intelligence computer in the process of prior user authentication based on the information required for authentication of related persons and the information collected by itself Technical Solution As a technical solution for achieving the object of the present invention, a first aspect of the present invention provides an identity authentication system including: an operating computer that receives and manages the information on the related person group and related persons of the authentication requester by receiving the request for user authentication, and manages the generated user authentication information and identity confirmation information of the user; an artificial intelligence computer that forms a big data database by analyzing information collected through the Internet social network, etc. of information such as words used in daily conversations and conversations between acquaintances, and receives communication history information of a group of related persons according to a user authentication request from the operating computer, checks the identity, and transmits the information to the operating computer; a data storage computer that storages data of communication contents information including a user authentication requester information, related person group information, mobile phone text message of the related person group, sending/receiving message using the chatting application program of the mobile phone, voice call using the internet call service, texts of e-mail and social network service(SNS), and voices using voice communication programs and data of identity verification information transmitted from the artificial intelligence computer; an analysis data storage computer that storages the big data database collected and analyzed by the artificial intelligence computer, the information analyzed by the artificial intelligence computer on the communication details of the related persons group received from the operating computer, various data analysis information of the artificial intelligence computer, and statistics based thereon; a user authentication approval requesting means provided in the authentication requester terminal of the authentication requester that is communicatively connected with the operating computer to request identity authentication and receive identity authentication approval information; an identity verification data proving means provided in at least one related person terminal that is communicatively connected with the operating computer to provide information such as relationship information and communication details with the user authentication requester to the operating computer.

A second aspect of the present invention provides an identity authentication method comprising: receiving, by the operating computer, the authentication requester information and at least one password from the authentication requester terminal of the authentication requester who wants to receive user authentication, and storing the information as a member; receiving, by the operating computer, user authentication approval request data including the name and photo of authentication requester, or the name and number of mobile phone, password, information of related persons stored in the communication capable terminal of the authentication requester, and the intention to use the information of the related persons; transmitting, by the operating computer, information of authentication requester including the name and photo of the authentication requester, or the name and mobile phone number of the authentication requester and an identity verification request message to the related persons group terminal of the related persons of the authentication requester; receiving, by the operating computer, information of related persons including identity verification data necessary for determining identity of the authentication requester, communication details with the authentication requester, and relationship of the authentication requester transmitted by the related persons group terminal; sending, by the operating computer, information of related persons including communication details with the authentication requester transmitted from the related person group terminal to an artificial intelligence computer, and requesting identity verification determination; comparing, by the operating computer, relationship data that analyzes information such as words and expressions used in daily conversations and conversations between acquaintances that it owns with relationship-related big data stored in the database, generating identity verification information when the consistency exceeds a certain ratio and transmitting the identity verification information to the operating computer; receiving and storing, by the operating computer, the identity verification information of related persons of the authentication requester transmitted from the artificial intelligence computer, and transmitting user authentication approval information generated based on this to the authentication requester terminal based on this information.

A third aspect of the present invention provides an identity authentication method comprising: receiving, by the operating computer, the authentication requester information and at least one password from the authentication requester terminal of the authentication requester who wants to receive user authentication, and storing the information as a member; receiving, by the operating computer, user authentication approval request data including the name and photo of authentication requester, or the name and number of mobile phone, password, information of related persons stored in the communication capable terminal of the authentication requester, and the intention to use the information of the related persons; transmitting, by the operating computer, information of authentication requester including the name and photo of the authentication requester, or the name and mobile phone number of the authentication requester and an identity verification request message to the related persons group terminal of the related persons of the authentication requester; receiving, by the operating computer, information of related persons including identity verification data necessary for determining identity of the authentication requester, communication details with the authentication requester, and relationship of the authentication requester transmitted by the related persons group terminal; sending, by the operating computer, information of related persons including communication details with the authentication requester transmitted from the related person group terminal to an artificial intelligence computer, and requesting identity verification determination; comparing, by the operating computer, relationship data that analyzes information such as words and expressions used in daily conversations and conversations between acquaintances that it owns with relationship-related big data stored in the database, generating identity verification information when the consistency exceeds a certain ratio and transmitting the identity verification information to the operating computer; receiving and storing, by the operation computer, the identity verification information of the related persons of the authentication requester transmitted from the artificial intelligence computer; receiving, by the operating computer, the user authentication approval request data including the name and face photo of the authentication requester, or name and mobile phone number, and the mobile phone number and password of the authentication requester, transmitted from the authentication requester terminal; determining, by the operating computer, whether the user authentication approval request data transmitted from the authentication requester terminal and the stored name and face picture of the authentication requester, or name and mobile phone number and password match; transmitting, by the operating computer, the user authentication approval information based on the identity verification information of the authentication requester stored in the authentication requester terminal if they match.

A fourth aspect of the present invention provides an identity authentication method comprising: analyzing and managing, by an artificial intelligence computer, communication details between a person who has been authenticated by an existing various means, such as a user authentication-related public certificate and mobile phone verification, and a related persons; setting and managing, by the artificial intelligence computer, criteria for how many or more related persons should be confirmed for each related person group of the authentication requester; performing statistical processing, by the artificial intelligence computer, contents of the analysis of the communication details between the person authenticated and the related persons, and by analyzing characteristics of transmission and reception of communication details between a person who has been authenticated according to the set criteria and the related persons; calculating and managing, by the artificial intelligence computer, average data of persons who have been authenticated or all members of the transmission/reception items for each group of related persons by using the statistics calculated through the analysis of the characteristic points on the transmission/reception; comparing and analyzing, by the artificial intelligence computer, the similarity and difference with the average data for the authentication request case of the authentication requester, determining whether the authentication is identical, and deriving identity verification information based on this.

Advantageous Effects

According to the present invention, it is possible only when the related persons of the authentication requester verify the identity in the authentication requester's user authentication. Therefore, it has the effect of resolving problems such as illegal use of user authentication means and hacking by supplementing the vulnerability of personal information security performed only with the name, photo, and phone number of the authentication requester during user authentication.

In addition, when the authentication requester requests for user authentication again, only the personal information of the authentication requester is checked and the identity authentication information of the related persons is used to approve the user authentication, thereby simplifying and convenient the process of user authentication.

BEST MODE FOR THE PREFERRED EMBODIMENT

An identity authentication system comprising: an operating computer including computer hardware that causes the system to perform: receiving identity verification data including the identity consent of the authentication requester from the related persons on the basis of the access consent of the authentication requester or the related person information provided by the authentication requester; extracting relational data of communication details related to a specific relationship between persons through analysis of communication details information between related persons who agree on the identity of the authentication requester and the authentication requester; executing identity authentication of the authentication requester based on the consistency between the extracted relation data of communication details and the self-owned relation data related to a specific relationship between the person provided from an external medium or possessed by the user.

DETAILED DESCRIPTION OF THE PREFERRED EMBODIMENT

Hereinafter, embodiments of the present invention will be described in detail with reference to the accompanying drawings.

In order to help the understanding of the present invention, terms of the embodiments to be described below will be defined. Various computers and terminals used in the present invention may consist of hardware itself, or a computer program or web program that utilizes the hardware resources. For example, the operating computer of the present invention may consist of each component of hardware included in the operating computer, and may be composed of a computer program or web program executed by utilizing the hardware resources of the operating computer.

In addition, acquaintances, relatives, and neighbors used in the embodiment of the present invention may be used as the same meaning.

Figure 1:
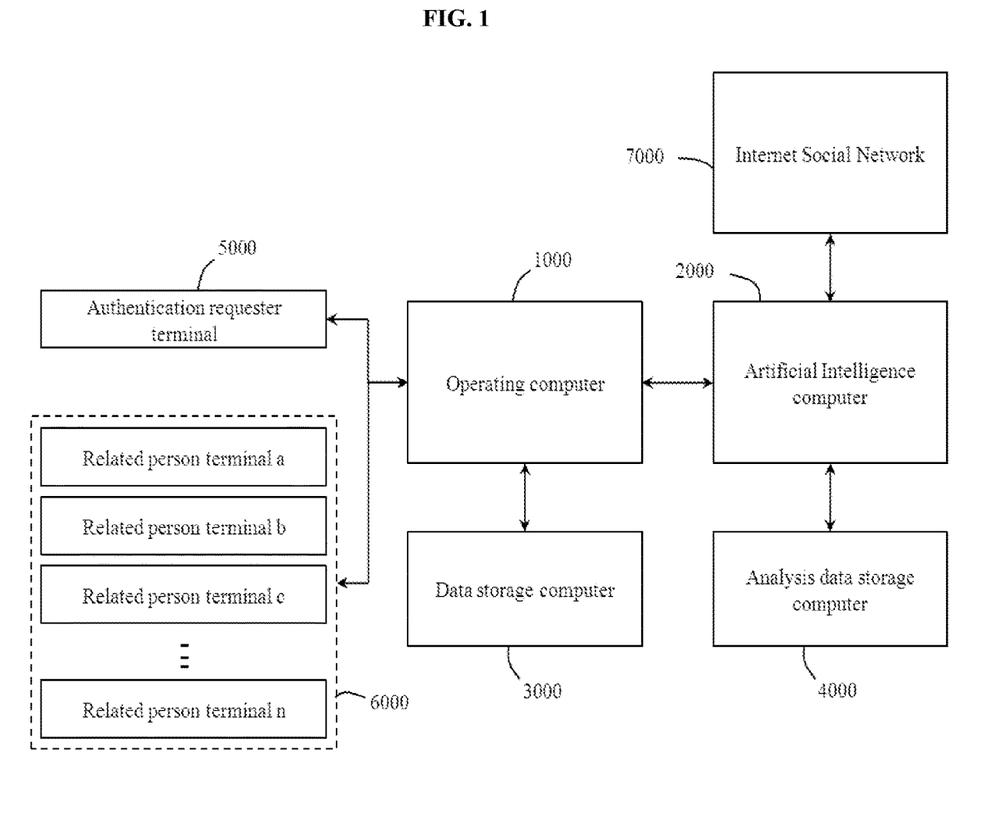
FIG. 1 is a schematic configuration diagram of an embodiment of an identity authentication system of the present invention.

FIG. 1 is a schematic configuration diagram of an embodiment of an identity authentication system of the present invention.

As illustrated in FIG. 1, the identity authentication system of the present invention comprising: an operating computer 1000 that receives and manages the information on the related person group and related persons of the authentication requester by receiving the request for user authentication, and manages the generated user authentication information and identity confirmation information of the user; an artificial intelligence computer 2000 that forms a big data database by analyzing information collected through the Internet social network 7000, etc. of information such as words used in daily conversations and conversations between acquaintances, and receives communication details information of a group of related persons according to a user authentication request from the operating computer 1000, checks the identity, and transmits the information to the operating computer 1000; a data storage computer 3000 that storages data of communication contents information including a user authentication requester information, related person group information, mobile phone text message of the related person group, sending/receiving message using the chatting application program of the mobile phone, voice call using the internet call service, texts of e-mail and social network service(SNS), and voices using voice communication programs and data of identity verification information transmitted from the artificial intelligence computer 2000; an analysis data storage computer 4000 that storages the big data database collected and analyzed by the artificial intelligence computer 2000, the information analyzed by the artificial intelligence computer 2000 on the communication details of the related persons group received from the operating computer 1000, various data analysis information of the artificial intelligence computer 2000, and statistics based thereon; a user authentication approval requesting means provided in the authentication requester terminal 5000 of the authentication requester that is communicatively connected with the operating computer 1000 to request identity authentication and receive identity authentication approval information; an identity verification data proving means provided in at least one related person terminal 6000 that is communicatively connected with the operating computer to provide information such as relationship information and communication details with the user authentication requester to the operating computer 1000.

The operating computer 1000 may include a communication means, and may be configured as a server computer that may be executed by loading a computer program or a web program. More specifically, the operating computer 1000 may include at least one hardware processor and a memory storing a computer program, and the at least one hardware processor may be configured to control the execution of the computer program stored in the memory.

The artificial intelligence computer 2000 may include a communication means and may be configured as a server computer that may be executed by loading a computer program or a web program. More specifically, the artificial intelligence computer 2000 may include at least one hardware processor and a memory storing a computer program, and the at least one hardware processor may be configured to control the execution of the computer program stored in the memory.

In addition, the term of the artificial intelligence computer is not limited thereto. It goes without saying that various terms that perform a corresponding function can be used in place of various terms in an embodiment of the present invention. For example, it can be used interchangeably with terms such as analysis computer.

The data storage computer 3000 and the analysis data storage computer 4000 may be configured as a database management system (DBMS).

The authentication requester terminal 5000 and the related person terminal are provided with communication means and may be composed of terminals such as a smart phone, a tablet computer, a personal computer (PC), a notebook computer in which an application program or a web program can be executed.

The application program or web program provided in the authentication requester terminal 5000 may be configured as a personal authentication approval request means for requesting the user authentication approval to the operating computer 1000.

The application program or web program included in the related person terminal may be configured as an identity verification data providing means for providing the operating computer 1000 with relationship information and communication details with the requester of the user authentication.

The Internet social network 7000 is configured to include various social network services (SNS) and Internet media.

In the above configuration of the present invention, when the authentication requester terminal 5000 requests identity authentication, the operating computer 1000 receives information of related persons such as acquaintances of the authentication requester and communication information of related persons from the authentication requester. Based on this information, the operating computer 1000 requests and receives relation information and communication details information with the authentication requester from the related person group terminal 6000 in order to confirm whether the authentication requester is the same person from the related persons. The received communication details information of related persons is transmitted to the artificial intelligence computer 2000 to request identity verification. The artificial intelligence computer 2000 determines the consistency between the data analyzed by the received relationship information and communication details information of the related persons and the big data generated and stored by itself by collecting from the Internet social network 7000, checks the identity of the authentication requester, and transmits the identity verification information to the operating computer 1000. The operating computer 1000 transmits user authentication approval information to the authentication requester terminal 5000 based on the received the identity verification information.

When the communication details information is voice information, the information may be analyzed using voice recognition technology or by determining whether the voice matches, or using a voice text conversion technique, and the like.

The relationship information between the related persons and the authentication requester may include, for example, family members, relatives, friends, work colleagues, school classmates, social members, and acquaintances for hobbies.

In addition, the communication details information of the related persons or related persons group is, for example, a mobile phone text message (SMS, MIMS, etc.), a chat message in a chatting application program running on a mobile phone, and a text message on a social network service (SNS). It includes various types of communication information performed using a mobile phone, including communications, e-mail letters, and Internet voice calls on mobile phones.

In the embodiment of the identity authentication system of the present invention, the function of the artificial intelligence computer 2000 may be performed by the operating computer 1000 and the artificial intelligence computer 2000 may be omitted.

Figure 2:
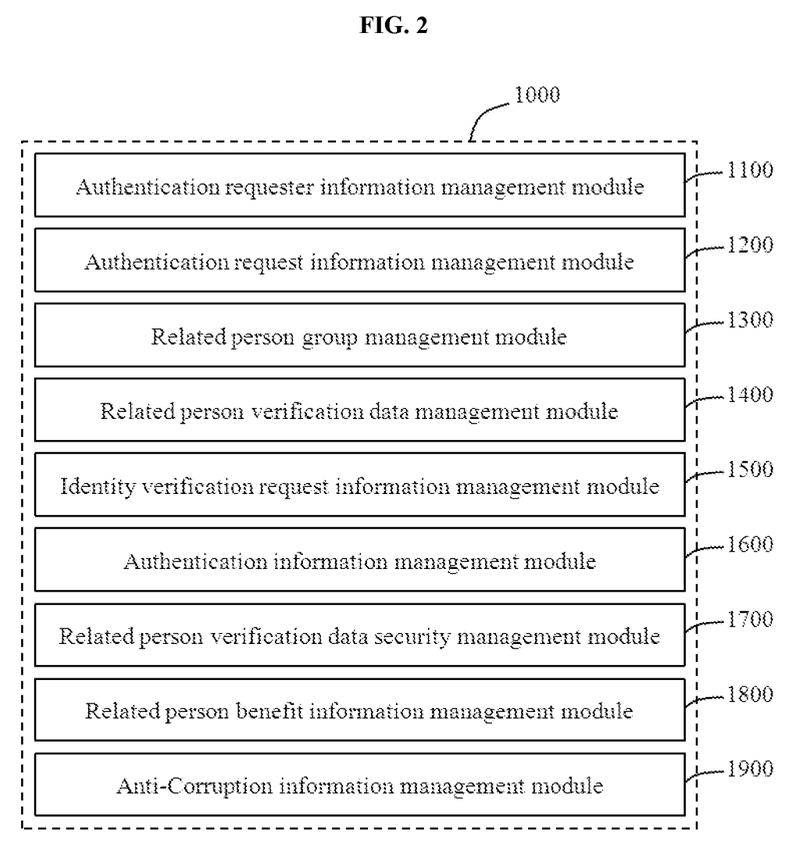
FIG. 2 is a schematic configuration diagram of an embodiment of an operating computer which is a main part of an embodiment of the identity authentication system of the present invention.

FIG. 2 is a schematic configuration diagram of an embodiment of an operating computer which is a main part of an embodiment of the identity authentication system of the present invention.

As illustrated in FIG. 2, the operating computer 1000 of the present invention or the identity authentication management means 1000 composed of a computer program executed on the operating computer 1000, etc. comprising: an authentication requester information management module 1100 that stores and manages the personal information of the authentication requester and at least one password information entered into the authentication requester terminal 5000 by the authentication requester of the user authentication in the data storage computer 3000; an authentication request information management module 1200 that receives and manages an authentication request data of the user authentication including information on pre-consent in providing information of related persons stored in the terminal being used, such as a mobile phone or personal computer (PC) of the authentication requester, personal information including the name and face photo of the authentication requester, or name and mobile phone number of the authentication requester, input into the authentication requester terminal 5000, and information on consent to the use of information of related persons such as acquaintances of the authentication requester; a related person group management module 1300 that receives and manages information of related persons including mobile phone number, e-mail address and SNS address of the related persons transmitted by the authentication requester terminal; a related person verification data management module 1400 that receives and manages a related person verification data including relationship information of the related person and the authentication requester and evidence data thereof, wherein when the operating computer 1000 transmits a request message confirming whether the authentication requester is the same person to the related person using the information of the related person, and it is determined that the related people input from the related person group terminal 6000 are the same person; an identity verification request information management module 1500 that requests and manages an identity verification information of the authentication requester by transmitting the related person verification data received from the related person group terminal 6000 to the artificial intelligence computer; an authentication information management module 1600 that receives and manages the identity verification information of the authentication requester transmitted from the artificial intelligence computer 2000; a related person verification data security management module 1700 that performs and manages encryption and decryption of information data and personal information of related persons received from the related person group terminal 6000; a related person benefit information management module 1800 that stores and manages benefit information including points given to related persons who have agreed to a request for verification of whether the authentication requester is the same while providing information on the related person, etc.; an anti-corruption information management module 1900 that filters the authentication requester or related persons providing false information for fraudulent purposes, granting penalty points to the wrongdoer, and manages it.

The security of information data and personal information of related persons in the related person verification data security management module 1700 is encrypted and stored to protect communication details and its contents.

When it is desired to analyze encrypted and stored communication details and its contents, the related person verification data security management module 1700 may decrypt and analyze the communication details and its contents, and then encrypt and store them again.

In addition, analysis processing is possible without decryption of communication details and contents encrypted by homomorphic encryption technology or the like.

In addition, for example, in order to prevent a case in which user authentication is performed by a person other than the user for an illegal purpose, the anti-corruption information management module 1900 can use the method of verifying the name through a bank account opened in the name of the authentication requester, or verifying the validity of the name of the authentication requester's mobile phone in use through password confirmation.

The motive of illegal use of the identity authentication system of the present invention can be blocked by taking measures such as giving a strong penalty to an illegal user or deducting a reliability score index.

Figure 3:
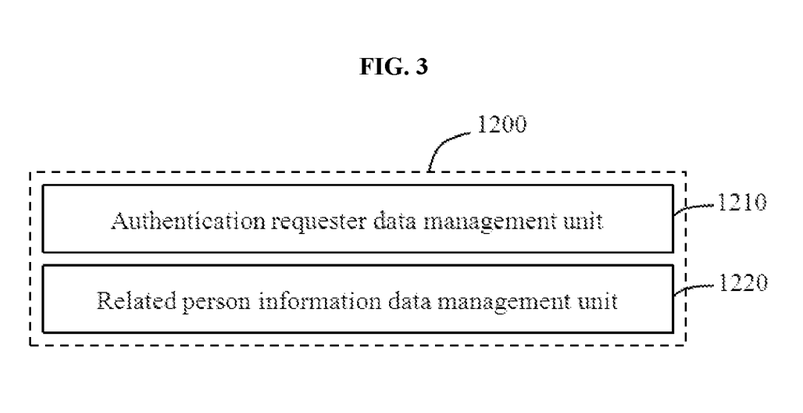
FIG. 3 is a schematic configuration diagram of an embodiment of an authentication request management module which is a main part of the embodiment of the operating computer in the identity authentication system of the present invention.

FIG. 3 is a schematic configuration diagram of an embodiment of an authentication request management module which is a main part of the embodiment of the operating computer in the identity authentication system of the present invention.

As illustrated in FIG. 3, the authentication requester data management module 1200 of the present invention comprising: an authentication requester data management unit 1210 that receives and manages data related to the information of related persons, such as acquaintances who know the authentication requester, stored in electronic devices capable of communicating with external communication media including mobile phones, tablet computers, notebook computers, and personal computers being used by the authentication requester, and the name and face photo, or name and mobile phone number, transmitted by the authentication requester who has requested user authentication by inputting it into the authentication requester terminal 5000; and a related person information data management unit 1220 that stores and manages the related person information and data such as the mobile phone number, e-mail address, and various social network service access of the related person.

When the face photo or mobile phone number input from the authentication requester terminal 5000 managed by the authentication requester data management unit 1210 is different from that previously managed, the operating computer 1000 stores the change history and can be managed.

Figure 4:
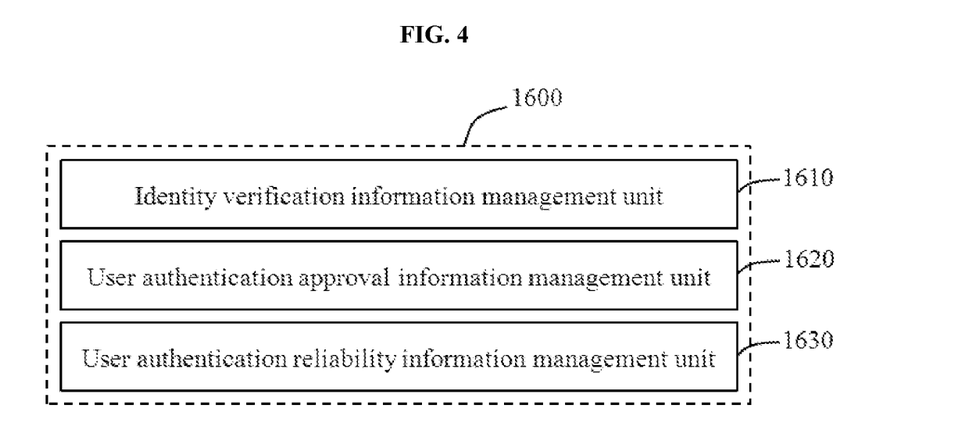
FIG. 4 is a schematic configuration diagram of an embodiment of an authentication information management module which is a main part of the embodiment of the operating computer in the identity authentication system of the present invention.

FIG. 4 is a schematic configuration diagram of an embodiment of an authentication information management module which is a main part of the embodiment of the operating computer in the identity authentication system of the present invention.

As illustrated in FIG. 4, the authentication information 1600 of the present invention comprising: an identity verification information management unit 1610 that receives and manages an identity verification information derived by analyzing the information provided by the related persons that the authentication requester transmitted from the artificial intelligence computer 2000 is the same person; a user authentication approval information management unit 1620 that generates a user authentication approval information, and transmits and manages the user authentication approval information to the authentication requester terminal of the user authentication requester; and a user authentication reliability information management unit 1630 that stores and manages reliability granting and reliability upgrade information to a person who has received approval for user authentication.

The reliability of the person who has received authentication approval managed by the user authentication reliability information management unit 1630 can be given a reliability index score of, for example, 80 points when the first user authentication is approved, and when data is further analyzed and authenticated by an artificial intelligence computer due to an increase in communication details in the future, a reliability index score may be additionally given according to a predetermined criterion. The predetermined criterion for adding the index score of reliability can be determined in proportion to, for example, the number of related persons who participated in the identity verification, the total number of related persons groups, the total period during which messages are transmitted and received, etc. In addition, it can be determined based on a numerical value that is proportional or inversely proportional to the user average of each item.

The at least one password input by the user who wants the authentication requester information management unit 1100 to receive user authentication is a means for preventing illegal use and involuntary use such as misuse, theft, etc. of the user authentication request. For example, two passwords can be set for daily use and for emergency use. The daily password is used to receive user authentication normally, and the emergency password is involuntarily obtained by coercion in abnormal situations such as kidnapping. The daily use password and the emergency password are set differently, and the daily use password and the emergency password are processed in the same way through the above-described procedure when an authentication request is made. However, the user can selectively set the emergency password.

In addition, the user can set or select the action to be taken on the operating computer when the user authentication request is made by entering the emergency password. For example, the operating computer may be set to transmit a message notifying that the user is in an emergency situation to a family member, lover, or friend along with location information. In addition, it can be set to request help by sending a message directly to an investigation agency such as a police station.

In addition, in relation to changing the password, the change of the daily password can be performed in a conventional way by accessing the operating computer, and the change of the emergency password can be performed only face-to-face in a specific location such as a financial institution or community center affiliated with the identity authentication system of the present invention.

In addition, an input field may be configured to input the password together with a name and a face photograph, or a name and a mobile phone number, on the application screen of the authentication requester terminal 5000 when the authentication requester terminal 5000 requests user authentication. In this case, the input order of the items to be entered into the input box may be entered arbitrarily. However, if the input order for each item is consistently set, a procedure for checking whether illegal use is performed may be performed according to a change in the input order.

Figure 5:
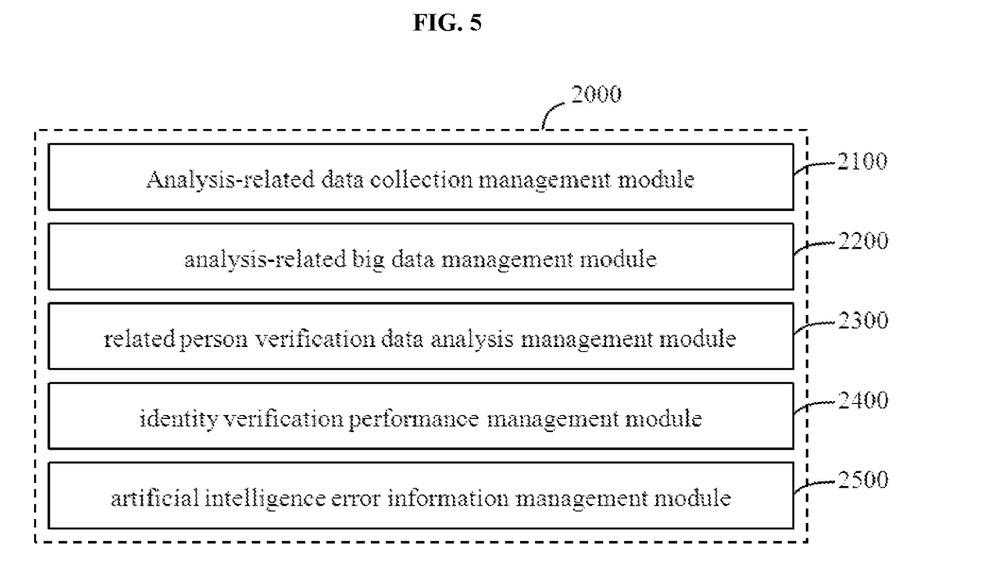
FIG. 5 is a schematic configuration diagram of an embodiment of an artificial intelligence computer which is a main part of an embodiment of the identity authentication system of the present invention.

FIG. 5 is a schematic configuration diagram of an embodiment of an artificial intelligence computer which is a main part of an embodiment of the identity authentication system of the present invention.

As illustrated in FIG. 5, an artificial intelligence computer 2000 of the present invention or an artificial intelligence identity verification management means 2000 consisting of a computer program executed on the artificial intelligence computer 2000 comprising: an analysis-related data collection management module 2100 that collects and manages data such as words, vocabulary, sentences, expressions, etc. used in the relationship in the relationship group of the authentication requester; an analysis-related big data management module 2200 that manages the data collected by the analysis-related data collection management module 2100 as big data and manages the update of big data; a related person verification data analysis management module 2300 that analyzes and manages data for each relationship in a relationship group based on information such as related persons of the authentication requester transmitted from the operating computer; an identity verification performance management module 2400 that determines whether the data for each relationship analyzed and the big data are consistent with each other to determine whether they are identical; an artificial intelligence error information management module 2500 that manages a method for determining an error when an error occurs in the operation of the artificial intelligence computer 2000, a method for manually setting the operation of the artificial intelligence computer 2000, and a method for solving the problem due to the rapid development of artificial intelligence, etc.

Determination of artificial intelligence operation errors in the artificial intelligence error information management module 2500, manual setting of operation, and problem solving due to strong artificial intelligence, respectively, can be controlled by using the collective intelligence convergence system (Applicant's Patent Registration No. 10-1804960).

Figure 6:
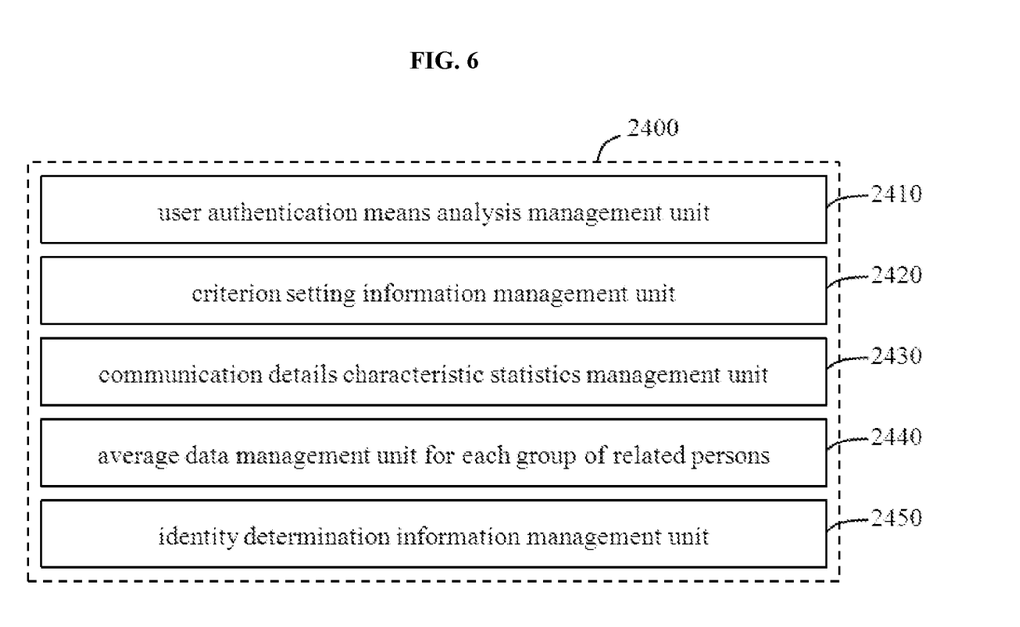
FIG. 6 is a schematic configuration diagram of an embodiment of an identity verification performance management module which is a main part of the embodiment of the artificial intelligence computer in the identity authentication system of the present invention.

FIG. 6 is a schematic configuration diagram of an embodiment of an identity verification performance management module which is a main part of the embodiment of the artificial intelligence computer in the identity authentication system of the present invention.

As illustrated in FIG. 6, an identity verification performance management module 2400 comprising: a user authentication means analysis management unit 2410 that analyzes and manages communication details between a person who has been authenticated by various existing means such as a user authentication-related accredited certificate and a mobile phone check and the related person; a criterion setting information management unit 2420 for setting and managing a criterion of how many or more persons should be confirmed by each group of related persons; a communication details characteristic statistics management unit 2430 that generates and manages statistics based on analysis contents of communication details in the user authentication means analysis management unit 2410 and analysis contents of the characteristics of transmission and reception of communication details between a person who has been authenticated and a related person according to the criteria set in the criterion setting information management unit 2420; an average data management unit 2440 for each group of related persons that calculates and manages average data of all members or persons who have been authenticated by the transmission/reception items for each related person group; an identity determination information management unit 2450 that compares and analyzes the similarities and differences with the average data for the authentication requests of the authentication requester to determine whether they are identical and manages the results.

The criterion setting information management unit 2420, for example, divides the related person group into family, friends, and workplace, and can set the criterion as the number of family members to at least 3, the number of friends to at least 7, and the number of office workers to at least 10.

In addition, the characteristics of transmission and reception in the communication history characteristic statistics management unit 2430 are, for example, the number of related persons for each group of related persons, the total transmission and reception period, the transmission/reception period, the number of transmission/reception, the reaction time between transmission and reception, title, subject, word, vocabulary, sentences, honorifics, abbreviations, whether emoticons are used, usage, punctuation marks, whether abbreviations or short words are used, singularities in content, etc.

The major mathematical values such as the average, standard deviation, maximum value, minimum value, etc. of each item related to the transmission/reception characteristics or frequently used expressions may be stored in the analysis data storage computer 4000.

The average data management unit 2440 for each group of related persons may write, for example, as shown in Table 1 below in order to calculate average data of transmission/reception items for each related person group.

TABLE 1

|  | family | friends | workplace |
| --- | --- | --- | --- |
| Number of related person | 3 persons | 7 persons | 10 persons |
| Total period of T/R | 350 days | 70 days | 280 days |
| Cycle of T/R | 5 days | 12 days | 2 days |
| Number of T/R | 2 times/week | 1 times/week | 3 times/week |
| Total time of T/R | 15 minutes | 90 minutes | 3 minutes |
| Topic | Meal | Promise | Work |
| Word | Rice | Location | Report |
| Sentence | Eat | Meet | Dining together |

T: Transmission/R: Reception

In the determination of identity in the identity determination information management unit 2450, for example, when the numerical value of a specific item, such as the number of related persons, is less than the average, the criterion of other items may be strengthened than the average.

For example, the transmission/reception period may be longer, the transmission/reception period may be further reduced, the number of transmission/reception is required more, the response time between transmission/reception may be further shortened, or the degree of matching of subjects, words, and sentences may be increased.

On the other hand, when the numerical value of a specific item, such as the number of related persons, is greater than the average, the criteria for other items may be relaxed compared to the average to determine equality.

The analysis-related big data management module 2200 of the artificial intelligence computer 2000 receives pre-entered data such as representative words, vocabulary, sentences, and expressions used in the relation by the system operator for each relation group of the authentication requester and data provided by those who have agreed to use the identity authentication system of the present invention, updates and accumulates data such as representative words, vocabulary, sentences, and expressions used in the relationship. In addition, the artificial intelligence computer can access various social network services (SNS) and internet media to collect expressions used in specific relationships, and store and manage these data in the analysis data storage unit 4000 as big data.

Figure 7:
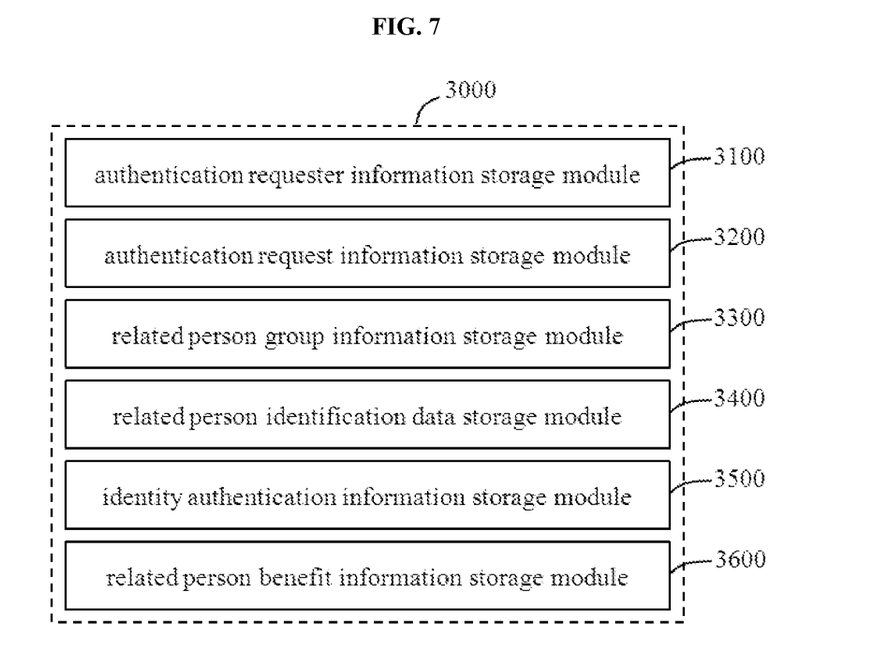
FIG. 7 is a schematic configuration diagram of an embodiment of a data storage computer which is a main part of an embodiment of the identity authentication system of the present invention.

FIG. 7 is a schematic configuration diagram of an embodiment of a data storage computer which is a main part of an embodiment of the identity authentication system of the present invention.

As illustrated in FIG. 7, the data storage means 3000 included in the data storage device 3000 of the present invention comprising: an authentication requester information storage module 3100 that stores personal information and at least one password of a person who wants to receive user authentication received from the operating computer 1000; an authentication request information storage module 3200 that stores the name and face photo of the authentication requester, or name and mobile phone number, information of related persons, etc. received by the operating computer 1000; a related person group information storage module 3300 that groups related persons provided by the authentication requester and stores related person group data; a related person identification data storage module 3400 that stores communication details data for each relationship group of the related person group received by the operating computer 1000; an identity authentication information storage module 3500 that stores the determined identity confirmation information by determining the consistency between the analysis result of the communication details data for each relationship group and the big data; a related person benefit information storage module 3600 that stores benefit information given to persons who have provided the operating computer 1000 with communication details with the authentication requester, etc.

Figure 8:
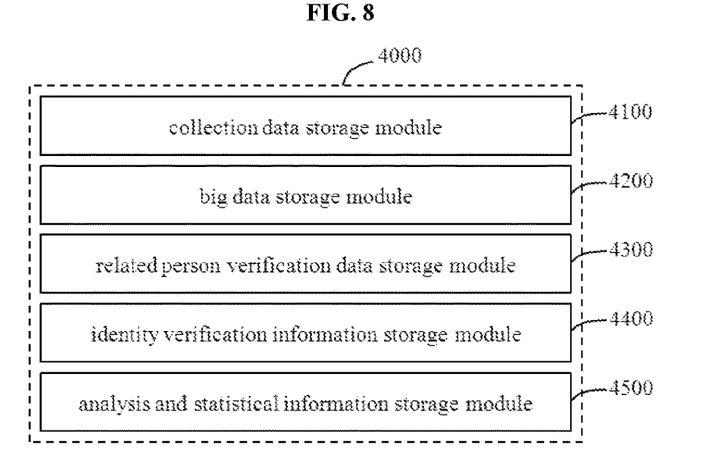
FIG. 8 is a schematic configuration diagram of an embodiment of an analysis data storage computer which is a main part of an embodiment of the identity authentication system of the present invention.

FIG. 8 is a schematic configuration diagram of an embodiment of an analysis data storage computer which is a main part of an embodiment of the identity authentication system of the present invention.

As illustrated in FIG. 8, an analysis data storage means 4000 included in the analysis data storage device 4000 of the present invention comprising: a collection data storage module 4100 that stores the data related to the verification of identity of the authentication requester collected by the artificial intelligence computer 2000 through various routes; a big data storage module 4200 that stores the collected identity verification related data as big data and managing updates; a related person verification data storage module 4300 that stores the analyzed related person verification data; an identity verification information storage module

4400 for storing identity verification information regarding whether the authentication requester determined by analysis by the artificial intelligence computer 2000 is the same person; a communication details characteristic statistics management unit 2430 that generates statistics information based on analysis contents of communication details in the user authentication means analysis management unit 2410 and analysis contents of the characteristics of transmission and reception of communication details between a person who has been authenticated and a related person according to the criteria set in the criterion setting information management unit 2420; an analysis and statistical information storage module 4500 that stores statistical information derived by analyzing the analysis information of information of related persons of persons for whom user authentication is approved and the characteristics of transmission and reception of communication details between persons for whom user authentication is approved and related persons by the artificial intelligence computer.

The data storage means 3000 and the analysis data storage means 4000 are not limited to the above embodiment.

In addition, it may be configured to store execution results of the operating computer 1000 and the artificial intelligence computer 2000.

In the embodiment of the present invention, in the case of the identity verification of a corporation (company) where the authentication requester is not an individual, for example, considering that there is no risk of personal information leakage and the method of the identity verifying of a corporation is well established in the existing system. Therefore, taking this advantage into consideration, it is possible to set a different criterion, such as using a corporate address instead of a photograph, or to apply a more relaxed method for verifying identity than for an individual.

For example, if the authentication requester is a corporation (company), the related person group can be set as at least one employee, customer, and customer. In addition, as an auxiliary means to prevent illegal use, verification through the bank of the corporation (company), verification through corporate registration number inquiry, or verification through business registration number can be used.

Figure 9:
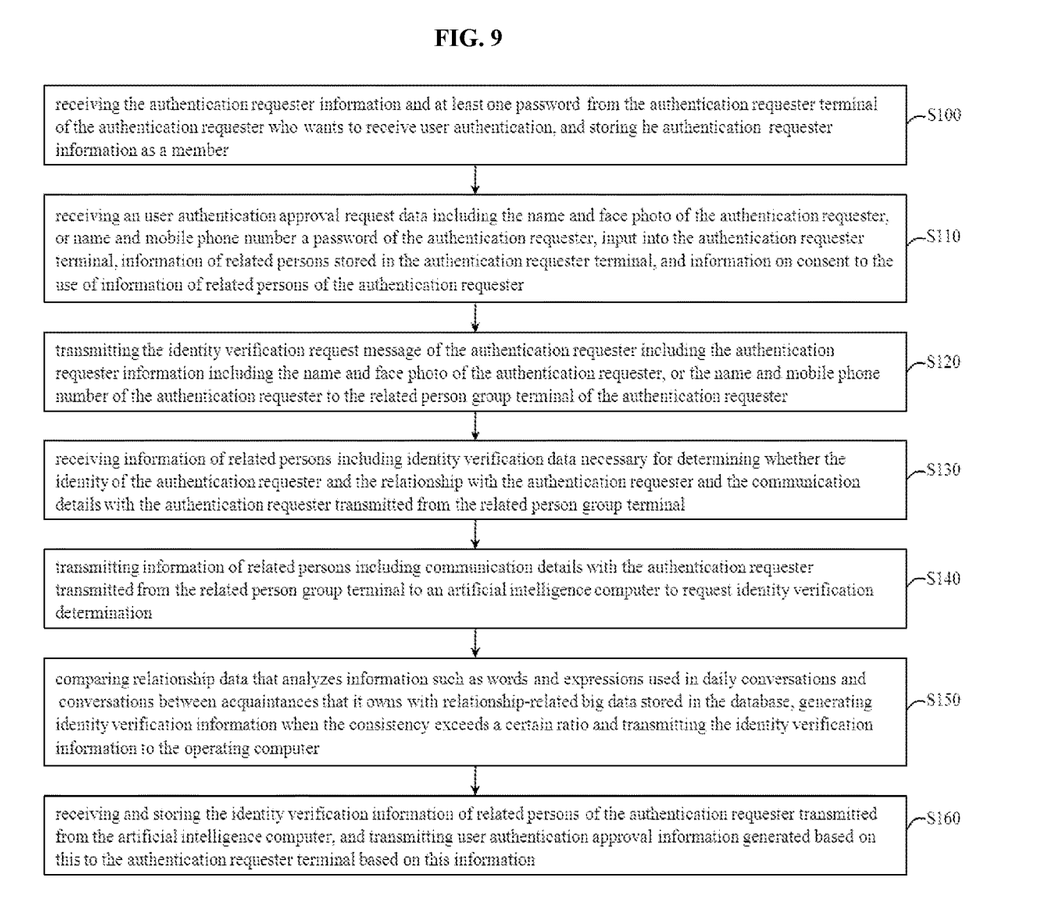
FIG. 9 is a flow chart for describing an embodiment of an identity authentication method of the present invention.

FIG. 9 is a flow chart for describing an embodiment of an identity authentication method of the present invention.

As illustrated in FIG. 9, the identity authentication method of the present invention comprising: receiving, by the operating computer, the authentication requester information and at least one password from the authentication requester terminal of the authentication requester who wants to receive user authentication, and storing the authentication requester information as a member S100; receiving by the operating computer, an user authentication approval request data including the name and face photo of the authentication requester, or name and mobile phone number a password of the authentication requester, input into the authentication requester terminal, information of related persons stored in the authentication requester terminal, and information on consent to the use of information of related persons of the authentication requester S110; transmitting, by the operating computer, the identity verification request message of the authentication requester including the authentication requester information including the name and face photo of the authentication requester, or the name and mobile phone number of the authentication requester to the related person group terminal of the authentication requester S120; receiving, by the operation computer, information of related persons including identity verification data necessary for determining whether the identity of the authentication requester and the relationship with the authentication requester and the communication details with the authentication requester transmitted from the related person group terminal S130; transmitting, by the operating computer, information of related persons including communication details with the authentication requester transmitted from the related person group terminal to an artificial intelligence computer to request identity verification determination 5140; comparing, by the operating computer, relationship data that analyzes information such as words and expressions used in daily conversations and conversations between acquaintances that it owns with relationship-related big data stored in the database, generating identity verification information when the consistency exceeds a certain ratio and transmitting the identity verification information to the operating computer S150; receiving and storing, by the operating computer, the identity verification information of related persons of the authentication requester transmitted from the artificial intelligence computer, and transmitting user authentication approval information generated based on this to the authentication requester terminal based on this information S160.

Figure 10:
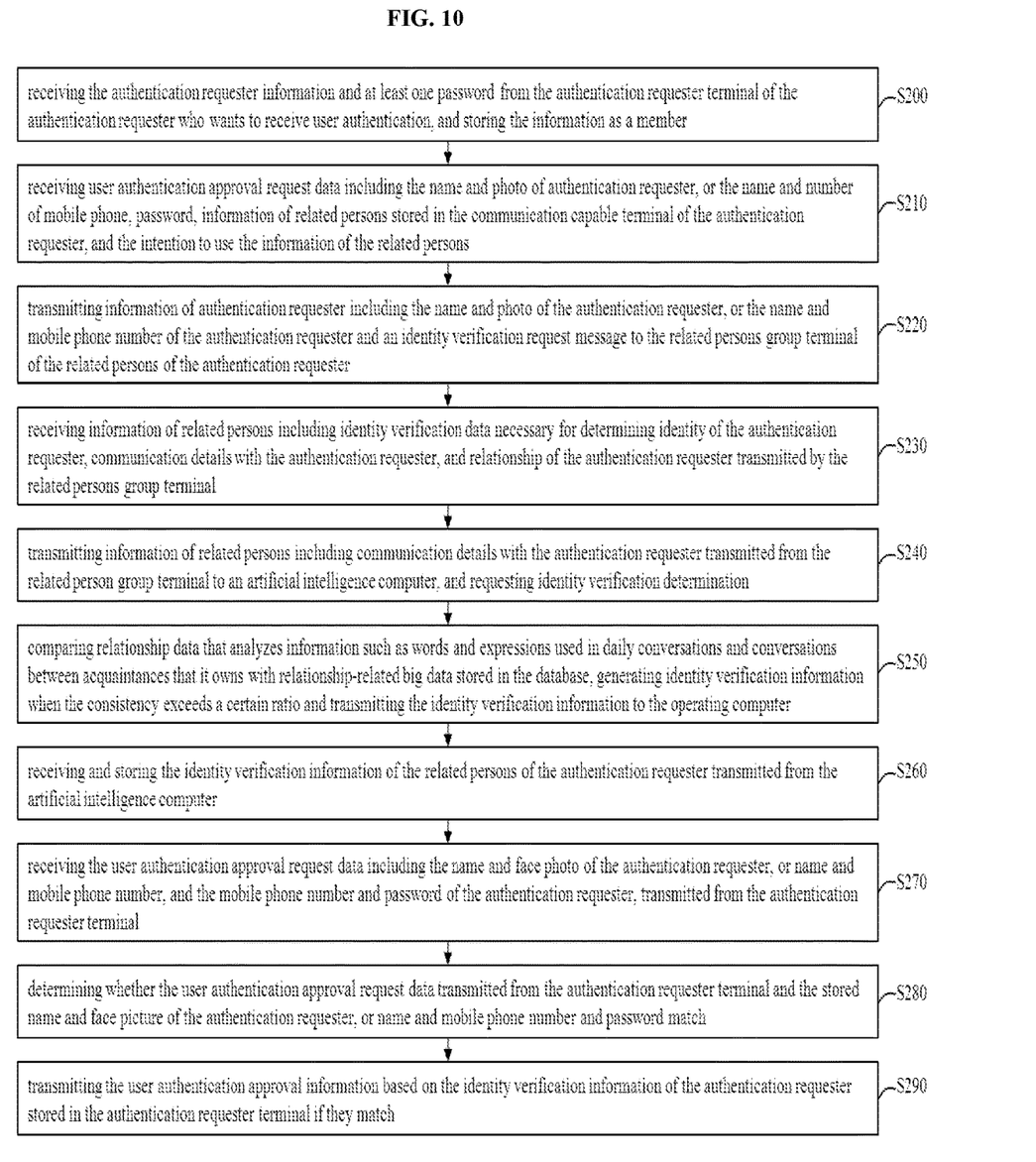
FIG. 10 is a flow chart for describing another embodiment of an identity authentication method of the present invention.

FIG. 10 is a flow chart for describing another embodiment of an identity authentication method of the present invention.

As illustrated in FIG. 10, the identity authentication method of the present invention comprising: receiving, by the operating computer, the authentication requester information and at least one password from the authentication requester terminal of the authentication requester who wants to receive user authentication, and storing the information as a member 5200; receiving, by the operating computer, user authentication approval request data including the name and photo of authentication requester, or the name and number of mobile phone, password, information of related persons stored in the communication capable terminal of the authentication requester, and the intention to use the information of the related persons 5210; transmitting, by the operating computer, information of authentication requester including the name and photo of the authentication requester, or the name and mobile phone number of the authentication requester and an identity verification request message to the related persons group terminal of the related persons of the authentication requester 5220; receiving, by the operating computer, information of related persons including identity verification data necessary for determining identity of the authentication requester, communication details with the authentication requester, and relationship of the authentication requester transmitted by the related persons group terminal 5230; transmitting, by the operating computer, information of related persons including communication details with the authentication requester transmitted from the related person group terminal to an artificial intelligence computer, and requesting identity verification determination 5240; comparing, by the operating computer, relationship data that analyzes information such as words and expressions used in daily conversations and conversations between acquaintances that it owns with relationship-related big data stored in the database, generating identity verification information when the consistency exceeds a certain ratio and transmitting the identity verification information to the operating computer 5250; receiving and storing, by the operation computer, the identity verification information of the related persons of the authentication requester transmitted from the artificial intelligence computer 5260; receiving, by the operating computer, the user authentication approval request data including the name and face photo of the authentication requester, or name and mobile phone number, and the mobile phone number and password of the authentication requester, transmitted from the authentication requester terminal 5270; determining, by the operating computer, whether the user authentication approval request data transmitted from the authentication requester terminal and the stored name and face picture of the authentication requester, or name and mobile phone number and password match 5280; transmitting, by the operating computer, the user authentication approval information based on the identity verification information of the authentication requester stored in the authentication requester terminal if they match S290.

Figure 11:
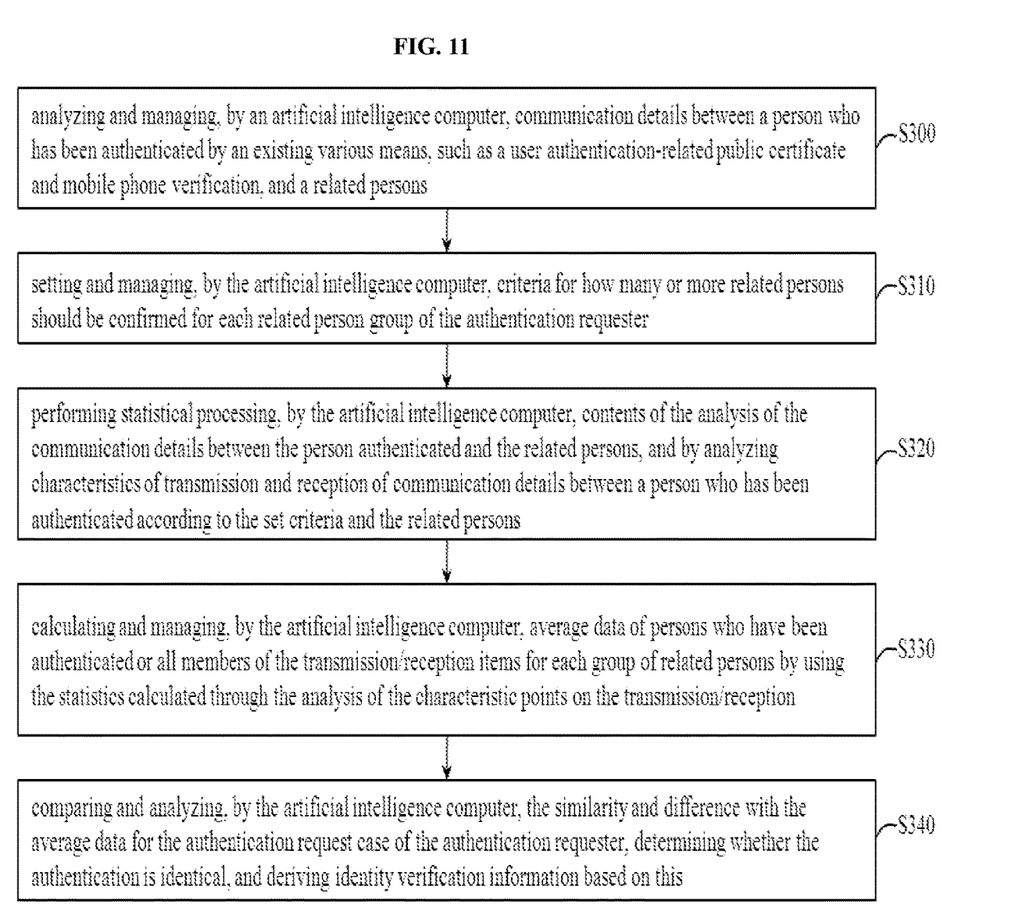
FIG. 11 is a flow chart for describing embodiment of an identity authentication method of an artificial intelligence computer which is a main part of the identity authentication method of the present invention.

FIG. 11 is a flow chart for describing embodiment of an identity authentication method of an artificial intelligence computer which is a main part of the identity authentication method of the present invention.

As illustrated in FIG. 11, the identity authentication method of the present invention comprising: analyzing and managing, by an artificial intelligence computer, communication details between a person who has been authenticated by an existing various means, such as a user authentication-related public certificate and mobile phone verification, and a related persons 5300; setting and managing, by the artificial intelligence computer, criteria for how many or more related persons should be confirmed for each related person group of the authentication requester 5310; performing statistical processing, by the artificial intelligence computer, contents of the analysis of the communication details between the person authenticated and the related persons, and by analyzing characteristics of transmission and reception of communication details between a person who has been authenticated according to the set criteria and the related persons 5320; calculating and managing, by the artificial intelligence computer, average data of persons who have been authenticated or all members of the transmission/reception items for each group of related persons by using the statistics calculated through the analysis of the characteristic points on the transmission/reception 5330; comparing and analyzing, by the artificial intelligence computer, the similarity and difference with the average data for the authentication request case of the authentication requester, determining whether the authentication is identical, and deriving identity verification information based on this S340.

When the object of identity confirmation according to the embodiment of the present invention is a thing other than a person (or a corporation), the identity of the thing can be checked using various information (communication details) transmitted and received between things connected through a communication means such as the Internet.

The terms and expressions used in the above embodiments of the present invention are not limited thereto. It is natural that various words and expressions that can be predicted by those of ordinary skill in the art may be replaced.

In addition, the embodiments of the present invention described above are only some of the various embodiments of the present invention.

It makes a request for authentication approval with the personal information of the authentication requester, and the artificial intelligence computer analyzes the communication details between the authentication requester and related persons, such as acquaintances of the authentication requester, to determine the compatibility with the related big data collected by the artificial intelligence computer itself. It goes without saying that various embodiments included in the technical idea of the present invention, in which the authentication requester is the same person, must be confirmed by the relevant persons to allow the authentication approval, fall within the protection scope of the present invention.

INDUSTRIAL APPLICABILITY

The present invention can be used in on/offline industries that require user authentication.

What is claimed is:

1. An operating computer for performing identity authentication of an authentication requester, comprising:
   a communication means configured to receive an identity authentication request to authenticate a user authentication of an authentication requester; and at least one processor configured to:
   receive a user authentication request data provided by an authentication requester terminal of the authentication requester who wishes to receive a user authentication, including name and photo of the authentication requester or the name and mobile phone number of the authentication requester and a password, information of the related persons stored in the communication-capable terminal of the identity requester, and the intention of the related persons to consent to the use of the information;
   transmit an identity verification requester message of the authentication requester including the name and photograph of the authentication requester, or the name and mobile phone number of the authentication requester, to related person terminal of the related persons;
   extract identity-related data by performing a determination of the identity of the authentication requester based on a relationship with the authentication requester, communication details with the authentication requester, and information of the related persons necessary to determine the identity of the authentication requester provided by related person terminal of the related persons;
   compare the identity-related data extracted by analyzing the information of the related persons and identity-related data of people stored by analyzing information such as words and expressions used in daily conversations and conversations between acquaintances in its possession, and generate identity verification information of the authentication requester when the consistency of the comparison results exceeds a certain percentage; and
   generate identity authentication information required for user authentication of the authentication requester based on the identity verification information of the authentication requester,
   wherein the related person of the authentication requester includes family members, relatives, friends, work colleagues, schoolmates, social club members, hobby acquaintances, and
   wherein the communications details include various forms of communications conducted using a mobile phone, including mobile phone text messages (SMS, MMS, etc.), chat messages in chat application programs running on the mobile phone, text communications on social networking services (SNS), e-mail letters, Internet voice calls from the mobile phone, etc.

2. The system for identity authentication of claim 1, wherein personal information of the authentication requester and related persons, and communication details information between the authentication requester and related persons are encrypted and stored, and only when analysis is required, it is decrypted and analyzed and then encrypted and stored again, or encrypted using homomorphic encryption technology and stored.

3. An operating computer that performs identity authentication of an authentication requester, comprising:
a communication means configured to receive an identity authentication request to authenticate a user authentication of an authentication requester; and at least one processor configured to:
receive a user authentication request data provided by an authentication requester terminal of the authentication requester who wishes to receive a user authentication, including name and photo of the authentication requester or the name and mobile phone number of the authentication requester and a password, information of the related persons stored in the communication-capable terminal of the identity requester, and the intention of the related persons to consent to the use of the information;
transmit an identity verification requester message of the authentication requester including the name and photograph of the authentication requester, or the name and mobile phone number of the authentication requester, to related person terminal of the related persons;
transmit information on the relationship with the authentication requester, communication details with the authentication requester, and information on the related persons necessary to determine whether the authentication requester is the same as the authentication requester provided by the related person terminal of the related persons to an analyzing computer, and request identity-related data by determining whether the authentication requestor is the same as the related person;
compare the identity-related data provided by the analysis computer with identity-related data of a person stored by analyzing information such as words and expressions used in daily conversations and conversations between acquaintances provided by an external medium or possessed by itself, and generate identity verification information of the authentication requester when the consistency of the comparison results exceeds a certain percentage; and
generate identity authentication information required for user authentication of the authentication requester based on the identity verification information of the authentication requester,
wherein the related person of the authentication requester includes family members, relatives, friends, work colleagues, schoolmates, social club members, hobby acquaintances, and
wherein the communications details include various forms of communications conducted using a mobile phone, including mobile phone text messages (SMS, MMS, etc.), chat messages in chat application programs running on the mobile phone, text communications on social networking services (SNS), e-mail letters, Internet voice calls from the mobile phone, etc.

4. The system for identity authentication of claim 3, wherein personal information of the authentication requester and related persons, and communication details information between the authentication requester and related persons are encrypted and stored, and only when analysis is required, it is decrypted and analyzed and then encrypted and stored again, or encrypted using homomorphic encryption technology and stored.

5. An identity authentication method comprising:
receiving, by an operating computer, a user authentication request data provided by an authentication requester terminal of the authentication requester who wishes to receive a user authentication, including name and photo of the authentication requester or the name and mobile phone number of the authentication requester and a password, information of the related persons stored in the communication-capable terminal of the identity requester, and the intention of the related persons to consent to the use of the information;
transmitting, by the operating computer, an identity verification requester message of the authentication requester including the name and photograph of the authentication requester, or the name and mobile phone number of the authentication requester, to related person terminal of the related persons;
extracting, the operating computer, identity-related data by performing a determination of the identity of the authentication requester based on a relationship with the authentication requester, communication details with the authentication requester, and information of the related persons necessary to determine the identity of the authentication requester provided by related person terminal of the related persons;
comparing, the operating computer, the identity-related data extracted by analyzing the information of the related persons and identity-related data of people stored by analyzing information such as words and expressions used in daily conversations and conversations between acquaintances in its possession, and generating identity verification information of the authentication requester when the consistency of the comparison results exceeds a certain percentage; and
generating, the operating computer, identity authentication information required for user authentication of the authentication requester based on the identity verification information of the authentication requester,
wherein the related person of the authentication requester includes family members, relatives, friends, work colleagues, schoolmates, social club members, hobby acquaintances, and
wherein the communications details include various forms of communications conducted using a mobile phone, including mobile phone text messages (SMS, MMS, etc.), chat messages in chat application programs running on the mobile phone, text communications on social networking services (SNS), e-mail letters, Internet voice calls from the mobile phone, etc.

6. The identity authentication method of claim 5, further comprising:
receiving, by the operating computer, user authentication approval request data including the name and photo of the authentication requester, or name, mobile phone number, and password transmitted from the authentication requester terminal;
determining, by the operating computer, whether the user authentication approval request data transmitted from the authentication requester terminal matches the stored name and photo of the authentication requester, or name and mobile phone number and password; and
transmitting, by the operating computer, user authentication approval information based on identity authentication information of the authentication requester stored in the authentication requester terminal if they match.

7. The identity authentication method of claim 5, wherein personal information of the authentication requester and related persons, and communication details information between the authentication requester and related persons are encrypted and stored, and only when analysis is required, it is decrypted and analyzed and then encrypted and stored again, or encrypted using homomorphic encryption technology and stored.

8. An identity authentication method comprising:
  receiving, an operating computer, a user authentication request data provided by an authentication requester terminal of the authentication requester who wishes to receive a user authentication, including name and photo of the authentication requester or the name and mobile phone number of the authentication requester and a password, information of the related persons stored in the communication-capable terminal of the identity requester, and the intention of the related persons to consent to the use of the information;
  transmitting, the operating computer, an identity verification requester message of the authentication requester including the name and photograph of the authentication requester, or the name and mobile phone number of the authentication requester, to related person terminal of the related persons;
  transmitting, the operating computer, to an analyzing computer information on the relationship with the authentication requester, communication details with the authentication requester, and information on the related persons necessary to determine whether the authentication requester is the same as the authentication requester provided by the related person terminal of the related persons, and requesting identity-related data by determining whether the authentication requestor is the same as the related person;
  comparing, the operating computer, the identity-related data provided by the analysis computer with identity-related data of a person stored by analyzing information such as words and expressions used in daily conversations and conversations between acquaintances provided by an external medium or possessed by itself, and generating identity verification information of the authentication requester when the consistency of the comparison results exceeds a certain percentage; and
  generating, the operating computer, identity authentication information required for user authentication of the authentication requester based on the identity verification information of the authentication requester,
  wherein the related person of the authentication requester includes family members, relatives, friends, work colleagues, schoolmates, social club members, hobby acquaintances, and
  wherein the communications details include various forms of communications conducted using a mobile phone, including mobile phone text messages (SMS, MMS, etc.), chat messages in chat application programs running on the mobile phone, text communications on social networking services (SNS), e-mail letters, Internet voice calls from the mobile phone, etc.

9. The identity authentication method of claim 8, further comprising:
  receiving, by the operating computer, user authentication approval request data including the name and photo of the authentication requester, or name, mobile phone number, and password transmitted from the authentication requester terminal;
  determining, by the operating computer, whether the user authentication approval request data transmitted from the authentication requester terminal matches the stored name and photo of the authentication requester, or name and mobile phone number and password; and
  transmitting, by the operating computer, user authentication approval information based on identity authentication information of the authentication requester stored in the authentication requester terminal if they match.

10. The identity authentication method of claim 8, wherein personal information of the authentication requester and related persons, and communication details information between the authentication requester and related persons are encrypted and stored, and only when analysis is required, it is decrypted and analyzed and then encrypted and stored again, or encrypted using homomorphic encryption technology and stored.

* * * * *